April 23, 1957     J. W. FILIPOFF ET AL     2,789,715
INTERCHANGEABLE TRUCK BODY
Filed May 16, 1955     4 Sheets-Sheet 4
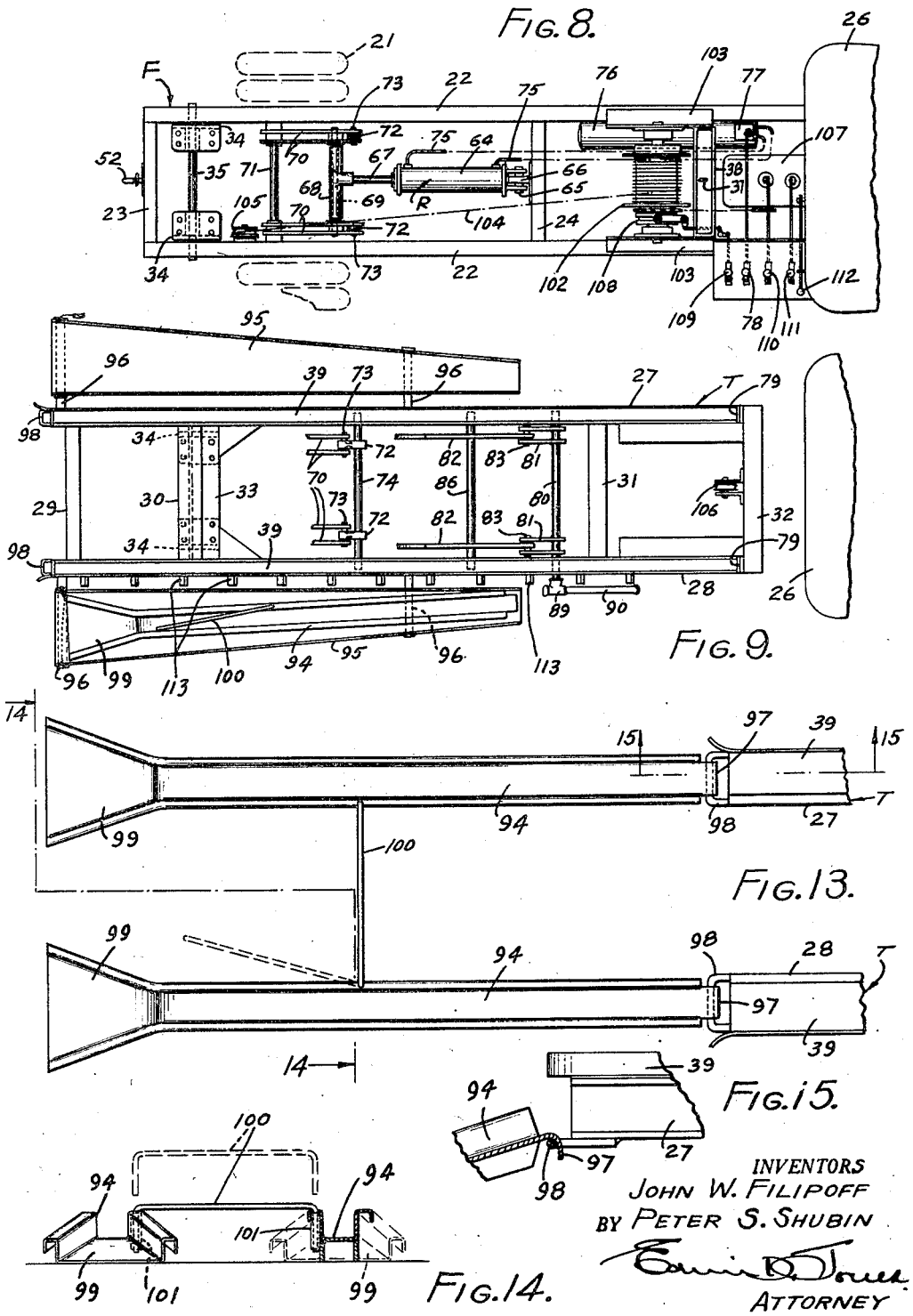
INVENTORS
JOHN W. FILIPOFF
BY PETER S. SHUBIN
ATTORNEY United States Patent Office 2,789,715
Patented Apr. 23, 1957

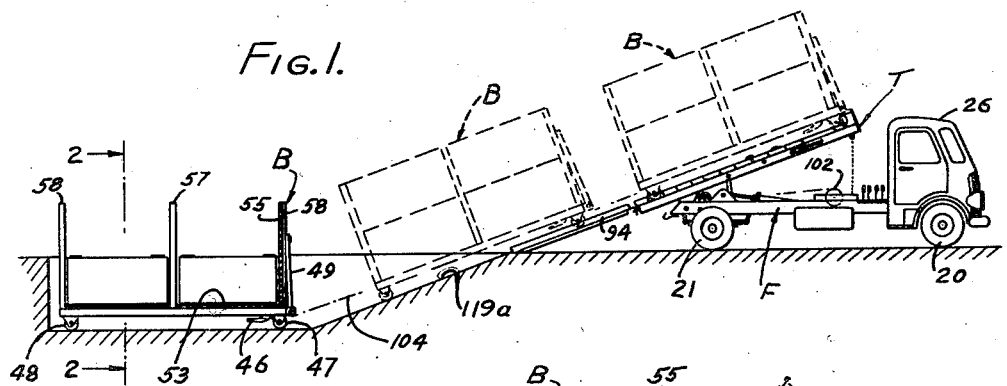
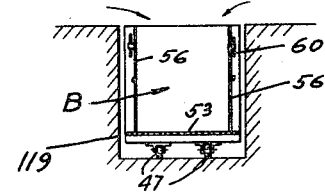
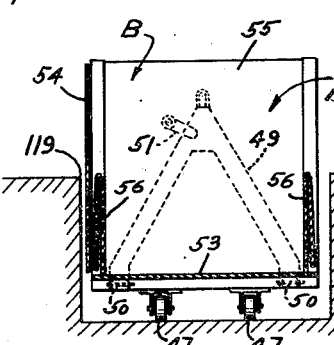
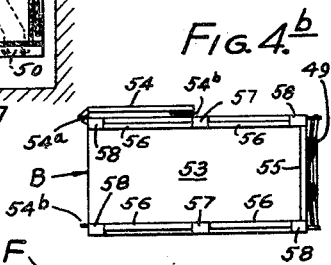
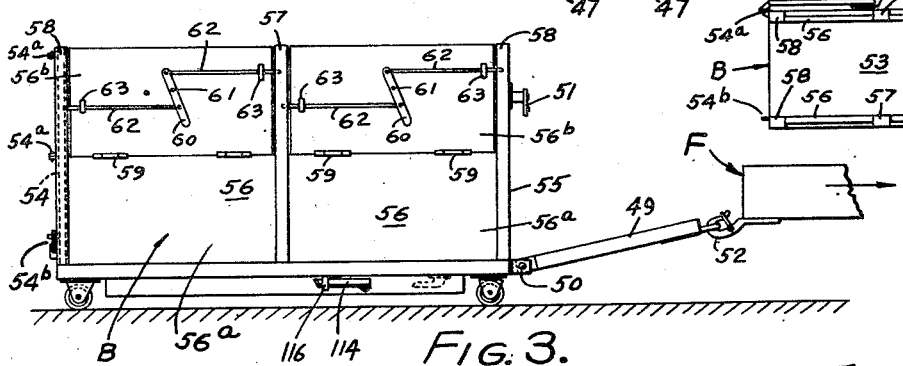
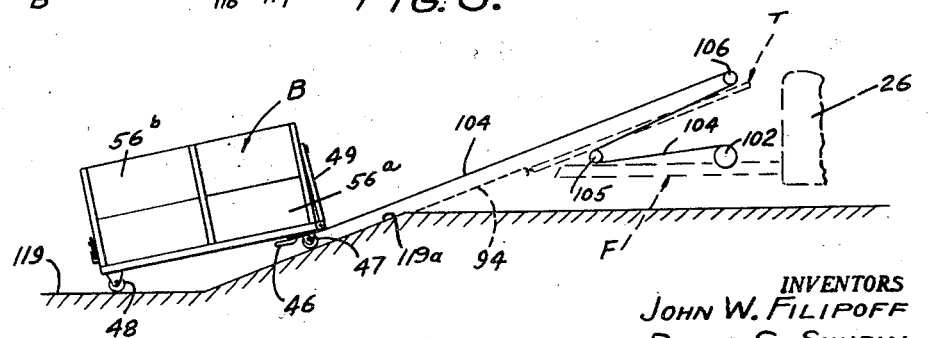

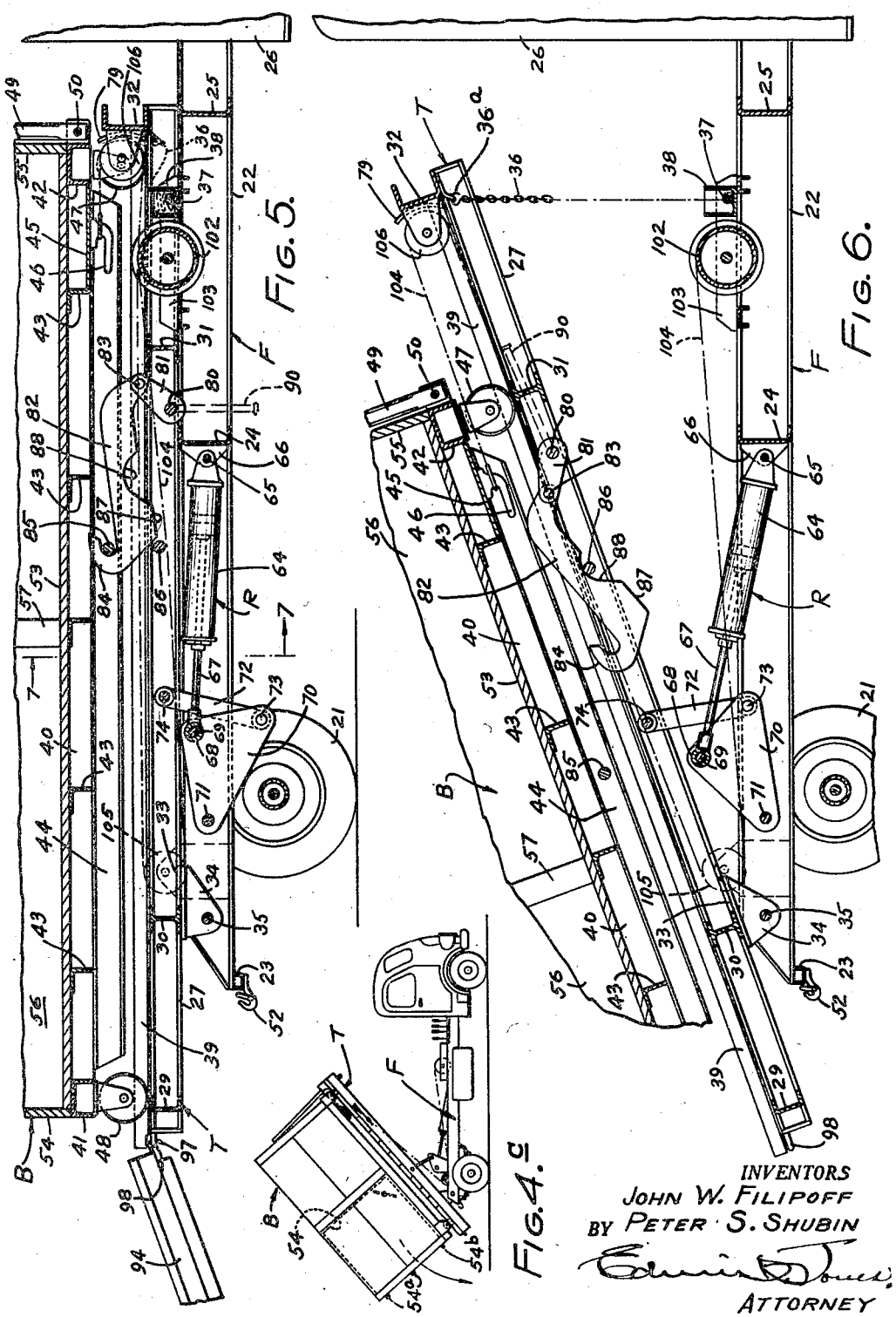

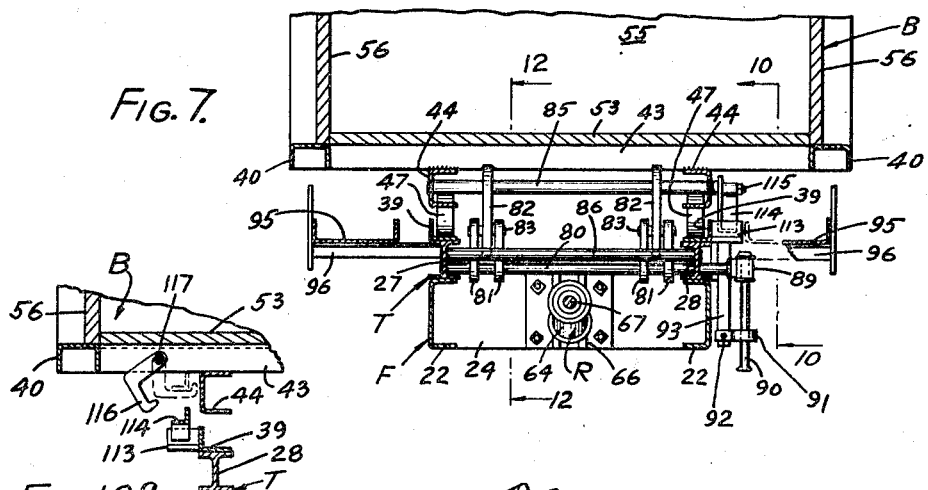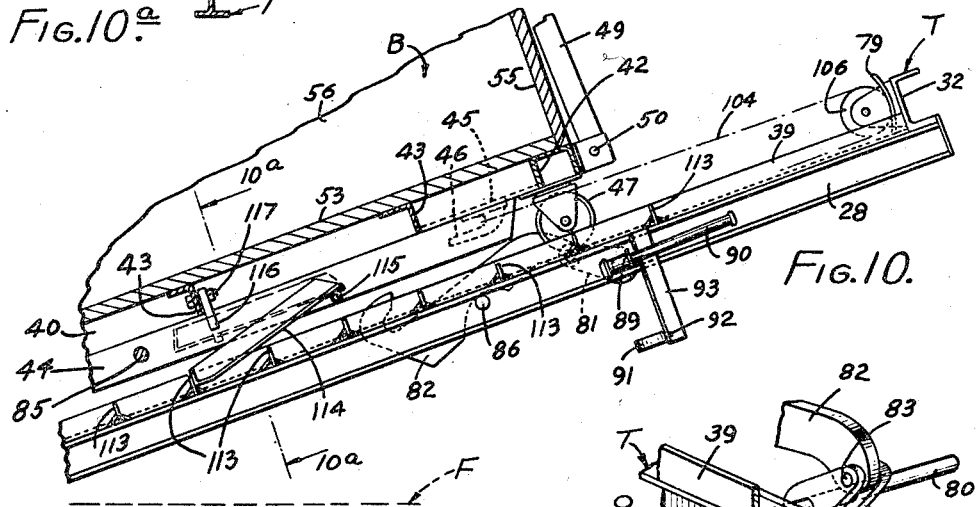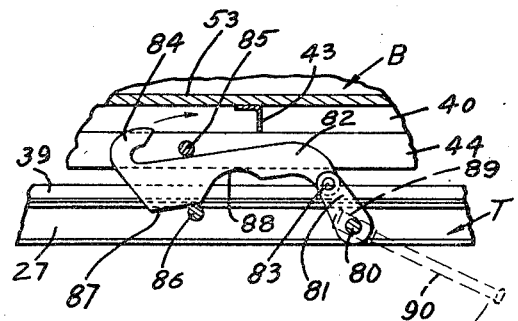

2,789,715

INTERCHANGEABLE TRUCK BODY

John W. Filipoff, Los Angeles, and Peter S. Shubin, San Pedro, Calif.

Application May 16, 1955, Serial No. 508,722

5 Claims. (Cl. 214—517)

Our invention relates to motor trucks of the dump type equipped with interchangeable and removable bodies so that the truck with one of the bodies thereon, may be engaged in transporting service while another body is being loaded. Our invention is intended primarily for use in motion picture studios where discarded or damaged scenery sets have to be removed from a lot and trucked to a remote destination for disposal by burning or burial. It is, of course, understood that such trucks are adapted for use by department stores and other mercantile establishments, and in any of its uses it permits the truck to be in practical continuous service, thereby avoiding the delays, labor and expense incident to loading and unloading motor trucks that are equipped with non-interchangeable bodies.

It is a purpose of our invention to provide in a motor truck of this character a body for the material to be transported, which is mounted for rolling movement on a frame supported on the truck chassis for upward and rearward tilting movement from a normal horizontal position, to cause the body to roll off of the frame and onto the ground for subsequent unloading of the material therefrom, so that by disconnecting it from the truck an interchangeable body already loaded with material can be rolled back onto the frame when, by restoring the latter to horizontal position and securing both the frame and the body in fixed positions on the chassis, the truck with its load can, with safety, be driven to a destination for dumping the contents of the body while the latter is retained on the truck, through elevation of the tilting frame to the required angle, and then opening the gate at the rear end of the body.

It is also a purpose of our invention to provide in combination with a motor truck of the character specified, of a pit into which an empty truck body can, after being removed from the truck, be lowered thereinto to facilitate loading thereof. The pit may be of a depth corresponding to the height of the truck body so that the top of the latter is flush with the ground surrounding the pit, and whereby the material to be transported can with ease and dispatch be dumped into the truck body. Also the pit may be of depth less than the height of the truck body. In this event the sides of the truck body are made with fixed lower sections and movable upper sections foldable on the lower sections to open the body sides to a level corresponding to the top of the pit, thus facilitating shoveling or dumping material into the body to load the same.

Another purpose of our invention is the provision of a power driven mechanism for controlling rolling movement of the truck body off of the tilting frame and onto the ground in such manner as to prevent damage to the body, the frame and other parts of the truck, such mechanism also being operable to draw the body back onto the platform.

A further purpose of our invention is to provide simple and effective hydraulic means for lifting the tilting frame, to tilted position, and holding it in such position while a truck body is rolled off or on the frame, and then returning the frame to its normal horizontal position on the truck chassis and securely holding it in such position during transit of the truck.

Another purpose of our invention is the provision of a manually operable mechanism for latching the truck body in transporting position on the tilting frame with such security as to prevent any movement of the body on the frame during transit of the truck.

A further purpose of our invention is to provide a simple and effective means which is automatically operable to prevent retrograde movement of the truck body on the tilting frame as it is hauled back onto the frame, so that should the mechanism employed for such hauling fail or become disconnected from the body, the body cannot roll off of the frame.

Another purpose of our invention is the provision of a pair of ramp rails normally carried on the truck, but attachable to the rear end of the latter to form a ramp on which the truck body can be rolled from the tilting frame onto the ground, as well as to roll the body back onto the frame, the lower ends of such rails being flared and flanged to guide the body rollers onto the rails as the body is drawn thereonto.

We will describe only one form of interchangeable truck body embodying our invention, and will then point out the novel features thereof in claims.

In the accompanying drawings:

Fig. 1 is a view showing in side elevation and partly in section a motor truck having applied thereto one form of interchangeable body and one form of mechanism for moving the body onto and off of the truck, and illustrating the manner of using the invention in connection with a pit.

Fig. 2 is an enlarged vertical sectional view taken on the line 2—2 of Fig. 1.

Fig. 3 is a view showing the truck body in side elevation as removed from the truck and reposing on the ground, and coupled to the truck so that it can be drawn over and to any point desired on the ground.

Fig. 4 is a view similar to Fig. 1 and illustrating diagrammatically the arrangement of cable and pulleys between the truck body and the winch.

Fig. 4a is a view on a reduced scale similar to Fig. 2 and showing the truck body in a pit of a depth corresponding to the height of the body.

Fig. 4b is a detail top plan view of the truck body showing the end gate thereof in open position.

Fig. 4c is a side elevational view showing, on a reduced scale, the truck with the body tilted to an angle for dumping, and the end gate thereof in open position.

Fig. 5 is an enlarged central longitudinal sectional view through the truck body and chassis, the body being in horizontal and latched position.

Fig. 6 is a view similar to Fig. 5 but showing the tilting frame in tilted position and the truck body in a corresponding position and in the process of rolling off the tilting frame.

Fig. 7 is a vertical sectional view taken on the line 7—7 of Fig. 5.

Fig. 8 is a top plan view of the truck chassis and its appurtenances.

Fig. 9 is a top plan view of the tilting frame.

Fig. 10 is a vertical sectional view taken on the line 10—10 of Fig. 7, the tilting frame and truck body being shown in tilted position.

Fig. 10a is an enlarged vertical sectional view taken on the line 10a—10a of Fig. 10.

Fig. 11 is a sectional fragmentary perspective view of a part of the latching mechanism for securing the truck body to the tilting frame.

Fig. 12 is a fragmentary sectional view taken on the line 12—12 of Fig. 7.

Fig. 13 is an enlarged top plan view of the ramp rails and how they are connected to the rear end of the tilting frame.

Fig. 14 is a view partly in section and partly in elevation and taken on the line 14—14 of Fig. 13.

Fig. 15 is a vertical sectional view taken on the line 15—15 of Fig. 13.

Referring more particularly to the drawings, our invention in its present embodiment includes a conventional form of truck chassis which comprises a frame F supported for rolling movement by front wheels 20 and rear wheels 21 (see Fig. 1), the frame consisting of parallel spaced longitudinal beams 22 connected by transverse beams 23, 24 and 25. At the forward end of the frame F is a driver's cab 26 and beneath the latter, but not shown, is a motor for driving the truck. To simplify the drawings no mechanism between the motor and the rear wheels 21 has been shown.

Pivoted for upward and rearward swinging movement is a tilted frame designated generally T and shown in Fig. 9 as comprising a pair of parallel spaced longitudinal beams 27 and 28 connected by transverse beams 29, 30, 31 and 32, the latter beam being on the top side and at the forward ends of the beams 27 and 28. A cross plate 33 is secured to the beams 30, 27 and 28 and is provided with depending ears 34, an axle 35 extending through the ears and into the longitudinal beams 27 and 28 whereby, a pivotal connection between the chassis frame F and the tilting frame T is provided so that the latter can be swung upwardly and rearwardly on the frame F from the horizontal position shown in Fig. 5 to that shown in Fig. 6. This latter position of the tilting frame is determined by a chain 36 detachably connected at its upper end to the beam 32 by a hook 36a, and at its lower end to an eye 37 fixed in a trough shaped beam 38 secured across the beams 27 and 28. As illustrated in Fig. 5, the chain 36 will be automatically folded into the beam 38 when the tilting frame is in horizontal position.

Secured to the top side of and substantially coextensive in length with the side beams 27 and 28, is a pair of rails 39 L-shape in cross section and which form a track upon which the truck body is adapted to be supported for rolling movement.

This truck body is generally indicated at B and includes a frame made up of two spaced and longitudinally extending beams 40 connected at their front and rear ends by transverse beams 41 and 42, and beneath their ends by transverse beams 43. To the underside of the transverse beams 43 are two longitudinal beams 44 spaced in parallelism and of less length than the beams 40. Adjacent the forward ends of the beams 40 is a cross plate 45 to the underside of which is secured a hook 46 so as to be disposed between the beams 44 and the major axis of the truck body.

As aforesaid, the body B is supported for rolling movement on the rails 39, and for this purpose a pair of caster wheels 47 mounted on the front beam 42 and a pair of rear wheels 48 on the rear beam 41. It will be understood that the caster wheels 47 allow ready steering of the truck body when removed from the tilting frame, and the body can be moved from place to place independently of the truck through the provision of a draft frame 49 pivoted as at 50 on the forward end of the truck body to occupy the vertical position shown in Fig. 1 when not in use and in which it may be retained by a latch 51, or to the inclined position shown in Fig. 3 where it may be coupled by a hook 52 to the rear end of the frame F so that the body can be moved from place to place when once removed from the truck onto the ground.

The truck body proper comprises a bottom wall 53, a back wall 54, a front wall 55 and two pairs of side walls 56. The wall 54 is in the form of an end gate supported on vertical hinges 54a so that it can swing about a vertical axis to occupy an open position as shown in Figs. 4b and 4c, and a closed position as shown in Fig. 3 where it is secured by a latch 54b. Between the side walls of each pair is a post 57, while at the ends of such walls are corner posts 58. Each side wall is made up of a lower section 56a fixed between the posts and an upper section 56b mounted on the lower section by hinges 59 so that it can swing from the closed position shown in Fig. 3 to the open position shown in Fig. 2.

Latching means is provided for each of the upper sections 56b for securing it in closed position. This latching means comprises, in the present instance, a lever 60 fulcrumed as at 61, with a pair of rods 62 connected to the lever on opposite sides of its fulcrum and supported in brackets 63. It will be understood that by operation of the levers, the rods 62 can be moved axially to engage within keepers formed in the posts 57 and 58 to secure the section in closed position.

The mechanism for swinging the tilting frame T to or from the tilted position shown in Fig. 6 comprises, in the present instance, a hydraulic ram R, the cylinder 64 of which is pivoted as at 65 to a bracket 66 secured to the cross beam 24. The piston rod 67 of the ram projects from the rear end of the cylinder 64 where it is pivotally connected to a tubular shaft 68 through which extends an axle 69 having its ends pivoted in the upper corner of two pairs of triangular levers 70. The rear corners of these levers 70 are pivotally mounted on a cross rod 71, and a pair of links 72 are pivoted at their forward ends to the forward corner of the levers as at 73. The upper ends of the links 72 are pivotally connected as at 74 to the side beams 27 and 28 of the tilting frame T.

To a pair of pipes 75 (see Fig. 8) connected to the opposite ends of the cylinder 64 pressure fluid from a tank 76 carried by the frame F can be supplied to the cylinder through operation of a suitable valve 77 by a lever 78 mounted on the frame F to move the piston rod 67 into or out of the cylinder for actuation of the levers 70 to raise or lower the tilting frame. As the rod 67 is moved rearwardly from the position shown in Fig. 5 the levers 70 are swung upwardly about the pivot 71 to lift the links 72 and thereby move the frame T to the elevated position shown in Fig. 6, and to which position it is limited by the chain 36. Conversely, when the piston rod 67 is moved forwardly in the cylinder, the levers and links are actuated to lower the frame T onto the frame F to occupy the horizontal position shown in Fig. 5.

In this horizontal position of the body B, the wheels 47 abut a spring bumper member 79 secured to the frame T at the rear side of the beam 32. The body B is releasably secured in this position to prevent any movement thereof during transit of the truck, by a manually operable latching mechanism which, in the present instance, comprises a shaft 80 journalled in the side beams 27 and 28 and having fixed thereto crank arms 81 arranged in spaced pairs along the length thereof and pivotally connected to a pair of latch links 82 as at 83. On the rear ends of these links bills 84 are formed which are adapted to engage a keeper rod 85 secured to and extending between the beams 44, and whereby the body B is securely latched against rearward movement on the tilting frame T. A supporting rod 86 extends between the beams 27 and 28 and is positioned to be engaged by the lower edges of the links 82 which are shaped to provide cams 87 and recesses 88.

As best shown in Fig. 11 one end of the shaft 80 projects over the adjacent beam 28 where it is formed with a T89 in which a handle 90 is slidably fitted to occupy the position shown in solid lines or the position shown in broken lines. In the broken line position the handle 90 can be retained by a metal strap 91 pivotally secured as at 92 to an angle bar 93 fixed to and depending from the adjacent beam 28 so as to occupy the solid line position in which the handle can be extended therethrough, or the broken line position in which it clears the handle so that the latter can be actuated as intended.

In the released position of the aforedescribed mechanism, as shown in Figs. 6 and 12, the links 82 repose on the rod 86 at the recesses 88, and thus the links are lowered so that their bills 84 are out of engagement with the keeper rod 85. To move the links into engagement with the keeper rod the shaft 80 is by operation of the handle 90 rotated in a clockwise direction thus actuating the arms 81 to move the links 82 forwardly as illustrated in Fig. 12.

Under such movement the cams 87 pass into engagement with the rod 86 thus swinging the links upwardly as they move forwardly and thereby causing the bills 84 to pass into engagement with the keeper rod 85, as illustrated in Fig. 5. It will be noted that in these latched positions of the links the crank arms 89 have passed over vertical dead center so as to retain the links in this position. However, to secure the links against possible movement, the handle 90 is moved to the broken-line position shown in Fig. 11 so that it can pass into the strap 91 and thus held against movement to prevent accidental rotation of the shaft 80.

Manifestly, when the frame T is in the elevated position shown in Fig. 6, the truck body B is free to roll downwardly therefrom. In order that the body B may pass onto the ground from the rear end of the frame T, a pair of ramp rails 94 (see Figs. 9 and 13) are provided. During transit of the truck these rails are carried in channeled supports 95 fixed to arms 96 projecting from the side beams 27 and 28 of the frame T. When the rails 94 are in use to form a ramp they are secured to the rear ends of the beams 27 and 28 by hooks 97 on the forward end of the rails engaging within eyes 98 fixed on the aforesaid beams.

The rear ends of the rails 94 which rest on the ground as the rails are attached at the forward ends to the beams, are outwardly flared to provide guideways 99. These guideways serve to guide the wheels of the truck body onto the rails 94 as the truck body is moved onto the rails and subsequently onto the frame T. The rails 94 are securable in spaced parallel positions by means of a spacing rod 100 which is of U-form, and has its parallel portions receivable in sleeves 101 fixed to the confronting sides of the rails, as best shown in Fig. 14. As indicated in this figure the rod 100 is removable from the sleeve 101 when the rails 94 are not in use, and it is adapted to be supported on one of the rails in the manner illustrated in Fig. 9, when the rails are replaced on its support 95 for transit on the truck.

While gravity operates to cause the body B to roll downwardly off of the frame T when the latter is in elevated position, and from the frame onto the ramp rails 94 and then onto the ground, to prevent damage to the truck body it is necessary to at all times control such movement of the body. For this purpose, as well as to return the body onto the frame T, the following mechanism is provided: A winch drum 102 (see Fig. 8) is rotatably mounted in brackets 103 secured to the beams 22, and about which is coiled a cable 104. One end of the cable is anchored to the drum, while the other end is secured to the hook 46 on the underside of the truck body B (see Fig. 6), and that portion of the cable between its ends is trained about a sheave 105 mounted on the frame F, and a second sheave 106 mounted on the forward end of the frame T. This arrangement of sheaves, cable and winch is shown diagrammatically in Fig. 4.

For drawing the winch drum 102 in one direction to wind the cable 104 thereon and thereby draw the truck body B onto the frame T following removal thereof, or to drive the drum in the other direction to pay-off the cable in a manner to control the speed of movement of the truck body downwardly and off the frame T, the following mechanism is provided:

As shown diagrammatically in Fig. 8 a conventional reversible power take-off mechanism 107 carried on the chassis frame F is adapted to be driven by the truck motor, and is operatively connected to the drum through a clutch 108, suitable manually operable control levers 109—112 being provided adjacent the valve operating lever 78.

To prevent the body B from accidentally rolling off the frame T during its return to the frame, which would occur should the cable 104 break or be unintentionally released, a pawl and ratchet mechanism is provided. This mechanism comprises (see Figs. 9 and 10) ratchet teeth 113 fixed at spaced intervals along and transversely of the top side of the beam 28, and a pawl 114 pivoted as at 115 on that body frame beam 44 directly above the beam 28, so as to engage any one of the teeth.

It will be clear that as the truck body is pulled upwardly of the frame T, the pawl 114 slides over the teeth 113 so as not to interfere with such body movement, but should the cable 104 break or be accidentally released, the pawl will instantly engage one of the teeth and thereby prevent retrograde movement of the body.

Incident to removal of the truck body from the frame T, the pawl 114 is manually lifted clear of the teeth 113 where it can be retained by a latch hook 116 pivoted as at 117 on one of the body beams 43 (see Figs. 10 and 10a).

In the operation of our invention, it will be understood that during transit of the truck the tilting frame T is secured in horizontal position on the chassis frame F by (see Fig. 5) the application of hydraulic pressure to the piston of the ram R so that it is urged forwardly in the cylinder 64. The truck body B is likewise firmly held against movement on the frame T by the latch 82 engaging the keeper rod 85 and thereby securely holding the front wheels 47 against bumper 79. During such truck transit the ramp rails 94 are carried on the supports 95 with the spacing rod 100 reposing on one of the rails as shown in Fig. 9.

To remove the body B from the frame T and onto the ground, the ramp rails 94 are first attached to the rear end of the frame as shown in Figs. 6 and 15, whereupon the latch links 82 are disengaged from the keeper 86 through operation of the handle 90, to release the body. Now by actuating the ram R the elevating mechanism is operated to swing the frame T to the tilted position shown in Fig. 6 as determined by the length of the chain 36, and during which the cable 104 is payed-off the drum 102.

By now causing the drum 102 to be slowly driven in a counterclockwise direction as when viewed in Fig. 6, the body B is permitted to roll slowly off the frame T onto the rails 94 and finally onto the ground.

To draw the body B back onto the frame T it is only necessary to reverse rotation of the drum 102 when the cable 104 will be actuated to pull the body upwardly of the ramp rails 94 and finally onto the frame. During this operation the pawl and ratchet mechanism prevent any possible rolling of the body downwardly on the frame through accidental release of the drum or breaking of the cable. Once the body is restored to its original position and relatched through operation of the links 22, the frame T is then restored to horizontal position by operation of the ram R as will be understood.

When the body B is removed from the truck and onto the ground, it may be towed by the truck to any point desired for loading or unloading by coupling the draft tongue 4 to the hook as illustrated in Fig. 3, when the top body sections 56b may be swung to open position as shown in Fig. 2 to facilitate such loading or unloading.

To further facilitate loading the body B it may be lowered into a pit 119 with an inclined end 119a as shown in Figs. 1, 2 and 3, corresponding in depth to the height of the lower body sections 56a, when having previously opened the upper sections 56b, material may be dumped into the body from a portable receptacle 120 such as shown in Fig. 2. Or as shown in Fig. 4a, the pit may be of a depth corresponding to the height of the body B so that when the body is lowered thereinto on the incline 119a it is flush with the top of the pit to permit loading without opening the upper sections 56b.

An important feature of our invention is that when the truck with a loaded body thereon, reaches a destination, the contents of the body can be dumped therefrom without removing the body from the truck. This can be readily accomplished merely by detaching the chain 36 from the tilting frame and then operating the ram R to lift the tilting frame to an angle such as shown in Fig. 4c wherein the body B is caused to occupy a corresponding angle so that upon opening the gate 54 the contents of the body will by gravity be dumped therefrom onto the ground. It will be understood that during this dumping operation the body B is secured against movement on the tilting frame by the latch levers 82 engaging the keeper 85.

From the preceding manner of use of our invention, it becomes manifest that by providing a plurality of truck bodies identical in size as that of the body B, they can be interchanged one with the other so that one of the bodies when removed from the truck can be loaded with material while the truck is hauling another loaded body to a remote destination for unloading, thus saving time, labor and expense in the transporting of such materials. Moreover, it is apparent that by virtue of the hydraulic mechanism the tilting frame can be readily lowered and raised as required to effect removal of the truck body therefrom or to lower the body into horizontal position thereon for transporting it from place to place; that the latching mechanism affords secure latching of the truck body in horizontal position on the frame to prevent any movement thereof during transit of the truck; that the pawl and latch mechanism prevents accidental rolling of the truck body off of the tilting frame during a restoring operation of the body to the frame; and that through the provision of ground pits of different depths into which an empty truck body can be lowered as permitted by the cable mechanism, the loading of such body is greatly facilitated.

Although we have herein shown and described only one form of motor truck including one form of interchangeable truck body embodying our invention, and mechanisms for moving the body onto and off of the truck, preventing accidental rolling of the body off of the truck, and locking the body on the truck for safety during transit, it is to be understood that various changes and modifications may be made in such mechanisms without departing from the spirit of my invention and the spirit and scope of the appended claims.

What we claim is:

1. In a motor truck havig a chassis frame, a tilting frame pivoted transversely on the chassis frame for swinging movement from a horizontal position upwardly and rearwardly to a tilted position, a body supported on the tilting frame for rolling movement longitudinally on the latter, means on the chassis frame and connected to the tilting frame for moving the latter longitudinally thereon, a stop on and at the forward end of the tilting frame; the improvement comprising releasable latching means for securing the body against the stop to prevent rolling movement of the body on the tilting frame, said latching means comprising a shaft on the tilting frame, crank arms fixed to the shaft, latch links connected to the crank arms, a keeper fixed on the body, a handle for rotating the shaft in either direction, and cam means operating to move the latch links into and out of engagement with the keeper according as the shaft is rotated in one direction or the other.

2. In a motor truck having a chassis frame; a tilting frame pivoted transversely on the rear end of the chassis frame for swinging movement from a horizontal position upwardly and rearwardly to a tilted position; a body supported on the tilting frame for rolling movement forwardly onto and rearwardly off of the latter when tilted; means on the chassis frame and connected to the tilting frame for moving the latter to either of said positions; releasable latching means carried by the tilting frame and engageable with a part of the body for securing the latter against longitudinal movement on the tilting frame; mechanism on the chassis frame and connected to the body for controlling rolling movement of the latter off of the tilting frame when tilted, and for drawing the body back onto the tilting frame; coacting means on the body and the tilting frame operable to prevent accidental movement of the body downwardly on the tilting frame as the latter is being drawn back thereon; and a device for latching a part of said coacting means in a released position to render it inactive to prevent accidental movement of the body downward on the tilting frame.

3. In combination: a ground pit having an inclined end; a motor truck having a chassis frame; a tilting frame pivoted transversely on the rear end of the chassis frame for swinging movement from a horizontal position upwardly and rearwardly to a tilted position; a body supported on the tilting frame for rolling movement forwardly onto and rearwardly off of the latter when tilted, said body having side walls each comprising a fixed lower section of a height substantially corresponding to the depth of the ground pit, and an upper section mounted on the lower section to occupy an extended position in which it is coplanar vertically with the lower section, and a folded position in which it is parallel with said lower section; means on the chassis frame and connected with the tilting frame for moving the latter to either of said positions; ramp rails at the rear end of the tilting frame to provide a runway for the body between the tilting frame and the inclined end of the ground pit; and mechanism on the chassis frame and connected to the body for controlling movement of the latter off of the tilting frame when tilted and downwardly of the ramp rails onto said inclined end and into the ground pit, and for drawing the body back from the pit onto the tilting frame by way of said inclined end and the ramp rails.

4. In combination: a ground pit having an inclined end; a motor truck having a chassis frame; a tilting frame pivoted transversely on the rear end of the chassis frame for swinging movement from a horizontal position upwardly and rearwardly to a tilted position; a body supported on the tilting frame for rolling movement forwardly onto and rearwardly off of the latter when tilted, said body having side walls comprising two fixed lower sections each of a height substantially corresponding to the depth of the ground pit, and two upper sections each mounted on one of the lower sections to occupy an extended position in which it is coplanar vertically with the lower section, and a folded position in which it is parallel with said lower section; means on the chassis frame and connected with the tilting frame for moving the latter to either of said positions; ramp rails at the rear end of the tilting frame to provide a runway for the body between the tilting frame and the inclined end of the ground pit; and mechanism on the chassis frame and connected to the body for controlling movement of the latter off of the tilting frame when tilted and downwardly of the ramp rails onto said inclined end and into the ground pit, and for drawing the body back from the pit onto the tilting frame by way of said inclined end and the ramp rails.

5. In a motor truck having a chassis frame, a tilting frame pivoted transversely on the chassis frame for swinging movement from a horizontal position upwardly and rearwardly to a tilted position, a body supported on the tilting frame for rolling movement longitudinally on the latter, means on the chassis frame connected to the tilting frame for moving the latter longitudinally thereon, a stop on and at the forward end of the tilting frame; the improvement comprising coacting means on the body and the tilting frame operating to permit rolling movement on the body forwardly on the tilting frame, but to prevent rolling movement of the body rearwardly off of the tilting frame, said coacting means including ratchet teeth fixed on and extending in a series longitudinally of the upper side of the tilting frame, a pawl pivoted on the body above said teeth so as to normally gravitate into engagement therewith, and to be moved upwardly by said teeth when the body is moved forwardly on the tilting frame to cause the pawl to pass freely over said teeth, and a latch pivoted on the body for movement to retain the pawl in an elevated position clear of said teeth when once moved to said position.

References Cited in the file of this patent

UNITED STATES PATENTS

| | | |
|---|---|---|
| 1,368,456 | Robertson | Feb. 15, 1921 |
| 2,118,575 | Steinmitz | May 24, 1938 |
| 2,123,505 | Faries | July 12, 1938 |
| 2,216,972 | Gibson et al. | Oct. 8, 1940 |
| 2,467,764 | Martin | Apr. 19, 1949 |
| 2,613,827 | Van Doorne | Oct. 14, 1952 |
| 2,703,658 | Bazzell | Mar. 8, 1955 |
| 2,745,566 | Bouffard | May 15, 1956 |

FOREIGN PATENTS

| | | |
|---|---|---|
| 849,376 | Germany | Sept. 15, 1952 |
| 705,916 | Great Britain | Mar. 24, 1954 |